(12) United States Patent
Subhash et al.

(10) Patent No.: US 9,518,891 B2
(45) Date of Patent: Dec. 13, 2016

(54) METHOD AND APPARATUS FOR QUALITY OF SEAL AND PACKAGE INTEGRITY TESTING

(75) Inventors: Ghatu Subhash, Gainesville, FL (US); Bruce A. Welt, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 644 days.

(21) Appl. No.: 13/808,841

(22) PCT Filed: Jul. 18, 2011

(86) PCT No.: PCT/US2011/044310
§ 371 (c)(1),
(2), (4) Date: Jan. 7, 2013

(87) PCT Pub. No.: WO2012/012308
PCT Pub. Date: Jan. 26, 2012

(65) Prior Publication Data
US 2013/0111972 A1    May 9, 2013

Related U.S. Application Data

(60) Provisional application No. 61/366,365, filed on Jul. 21, 2010.

(51) Int. Cl.
*G01M 3/04* (2006.01)
*G01M 3/32* (2006.01)
*G01M 3/36* (2006.01)

(52) U.S. Cl.
CPC ........... *G01M 3/3263* (2013.01); *G01M 3/366* (2013.01)

(58) Field of Classification Search
CPC ...... G01M 3/007; G01M 3/26; G01M 3/2815; G01M 3/3263; G01M 3/366; G01M 3/00
(Continued)

(56) References Cited

U.S. PATENT DOCUMENTS 3,832,885 A * 9/1974 Hayward et al. ................. 73/52
3,913,383 A   10/1975 Kreula et al.
(Continued)

FOREIGN PATENT DOCUMENTS

JP    02-038835 A    2/1990

OTHER PUBLICATIONS

ASTM International, "ASTM Subcommittee F02.40: Published standards under F02.40 jurisdiction," Jun. 9, 2010 <www.astm.org>.
(Continued)

*Primary Examiner* — Hezron E Williams
*Assistant Examiner* — Truong Phan
(74) *Attorney, Agent, or Firm* — Saliwanchik, Lloyd & Eisenschenk

(57) ABSTRACT

Testing methods and equipment are provided for fast, non-destructive testing of the quality of seal and/or integrity of a package. According to certain embodiments, dynamic impact characterization is used to determine whether a loss of pressure due to a leak in the package occurs. The methods and equipment can be used in-line with product packaging processes. According to one embodiment, an initial pressure is applied to a package under test. A region of the package is impacted with a force sufficient to create a disturbance to the package while not destroying the package by using an impacting rod. Force sensors/transducers contact with the package and spaced a distance away from the impact region of the package detect a force signature from the impact. The existence of a leak is determined by evaluating the force signature.

2 Claims, 4 Drawing Sheets

(58) Field of Classification Search
USPC ........ 73/40, 12.01, 12.08, 41, 49.2, 49.3, 52
See application file for complete search history.

(56) References Cited

U.S. PATENT DOCUMENTS

| | | | |
|---|---|---|---|
| 3,942,381 A * | 3/1976 | Brown et al. ................... 73/703 |
| 4,116,043 A | 9/1978 | Pencak |
| 4,955,226 A * | 9/1990 | Beaty ...................... G01M 3/36 |
| | | | 73/49.3 |
| 5,266,316 A | 7/1993 | Malley et al. |
| 5,259,237 A * | 11/1993 | Aarts et al. .................... 73/49.3 |
| 5,345,829 A * | 9/1994 | Yamauchi ........... G01M 13/005 |
| | | | 277/321 |
| 5,531,101 A | 7/1996 | Fenlon |
| 6,343,502 B1 | 2/2002 | Subhash et al. |
| 6,347,546 B1 | 2/2002 | Rule |
| 6,427,524 B1 | 8/2002 | Raspante et al. |
| 8,230,722 B1 * | 7/2012 | Thornberg ............ G01M 3/229 |
| | | | 73/49.3 |
| 2002/0043898 A1 * | 4/2002 | Sebastian .................. G01L 1/16 |
| | | | 310/338 |
| 2003/0033857 A1 | 2/2003 | Franks |
| 2004/0154382 A1 * | 8/2004 | Chevalier et al. ............. 73/49.3 |

OTHER PUBLICATIONS

ASTM International, "ASTM F2338—09 Standard Test Method for Nondestructive Detection of Leaks in Packages by Vacuum Decay Method," Jun. 9, 2010 <www.astm.org>.

Witt Gas Techniques, "Witt recommends leak checks for food producers." The Engineer Source. Oct. 6, 2009 <source.theengineer.co.uk>.

TM Electronics, Inc., "Products: Leak and Leak/Flow Testers," Jun. 10, 2010 <www.tmelectronics.com>.

Nissin, "PinHole Seal Leak Detector," Jun. 9, 2010 <www.pinholetest.com>.

* cited by examiner

METHOD AND APPARATUS FOR QUALITY OF SEAL AND PACKAGE INTEGRITY TESTING

CROSS-REFERENCE TO RELATED APPLICATION

This application claims the benefit of U.S. Provisional Application Ser. No. 61/366,365 filed Jul. 21, 2010, which is hereby incorporated by reference in its entirety, including all figures, tables and drawings.

BACKGROUND OF THE INVENTION

Packages maintain the cleanliness and sterility of the product within from the manufacturing plant through transport, shelf life, and storage. Testing of the quality of seal and package integrity is of paramount importance in any packaging industry. For example, the quality of the seal and integrity of a package dictates the shelf life of food products (e.g., chips, frozen foods, children's beverage/juice packages, meat, dairy products, and fresh vegetables), medical products (e.g., pharmaceuticals), and cosmetic products (e.g., skin care and makeup).

ISO (International Organization for Standardization) and ASTM (originally known as the American Society for Testing and Materials) standards provide guidance for manufacturers to ensure package integrity and quality and the sterility and shelf life of the products within.

Package testing includes ensuring the integrity of the sealed package, and assuring that no weaknesses in the sealed areas of the package permit leaks to develop with handling stresses and time. Package integrity testing can be referred to as a "leak test" of the package. That is, package integrity testing determines whether there is a failure in the materials or process that allows contamination to enter. Seal strength testing, on the other hand, measures an attribute of the seal, which is designed to ensure that the seal presents a barrier to at least the same extent as the rest of the package. Both integrity and seal testing are important aspects of ensuring proper packaging.

Seal strength testing may include tensile stress testing (peel strength of the seal), which is used for packages with peel-open pouches, and inflation tests such as burst and creep testing, which are commonly used for testing both peelable and non-peelable seals. However, these tests, particularly the tensile stress test and the burst test, are typically destructive tests, requiring the rupturing of a package under test.

Specifically, the inflation tests typically require pressurizing the entire pouch and measuring the peak rupture pressure (burst test) or the time to failure at a constantly held pressure (creep test). The inflation tests provide peel stress with horizontal and vertical components, tension due to hoop stress in the vertical direction, and lateral stress due to package expansion. If these stresses are greater than the strength of the seal at any point within the package, the seal will rupture. When a seal is good, the base material will typically rupture before the seals will release in an inflation test. In a bad seal, a fracture or delamination of the laminate may be encountered in the seal area.

Package integrity testing is a measure of the package's barrier material and seal, providing a "leak test" of the whole package. In addition to seal bonding failures or disrupted seals, leakage can be the result of large holes, pinholes or cracks in package materials. Either source of leakage represents the potential for product contamination from elements of the ambient atmosphere outside of the package entering the package, and the potential for the materials inside the package to escape.

There are a number of commonly used physical tests for package integrity, including the visual inspection method, the internal pressure method (e.g., bubble testing), the vacuum leak method (in which the package is submerged in water inside a vacuum chamber and escaping bubbles are observed), and trace gas detection, where the package is pressurized with a gas other than air and then examined for escaping gas with a gas leak detector. However, these tests tend to be subjective and non-quantitative, and in some cases messy and difficult to perform.

An alternative method that overcomes these objections is the pressure (or vacuum) decay test. In particular, the pressure decay method is often used to perform package integrity (leak) testing on flexible pouches or other packages that have non-porous material surfaces and seals.

The pressure decay test is accomplished by pressurizing the package to a fixed pressure, shutting off the pressure and connecting a pressure transducer. After a settle time, any observed changes in pressure may indicate the presence of leakage paths in the package seals or pinholes in the surfaces. This leak may be represented in decay pressure units or calculated leak rate units. The pressure decay leak test cycle, from beginning to end, includes the time to engage the package with the measuring instrument, a charge time for pressurizing the package to a predetermined test pressure, a settle time for allowing the volume of the pressurized package to change and then stabilize due to the stresses introduced by pressurization and adiabatic temperature changes, a test time for actually measuring the decay of pressure, and an unloading time for unloading the package from the instrument. Vacuum decay testing functions identically to the positive pressure decay test cycle, and can also be a time consuming process. Furthermore, pressure decay testing supposes that a test package or pouch can be pressurized, and is generally a destructive test.

If the package is closed or sealed so it cannot be pressurized from an external source, an alternative method of pressure decay leak testing involves creating a closed space around the test package, creating a surrogate chamber, and pressurizing (or evacuating) the closed space. Air entering the package through a leak (or in the case of a vacuum test, leaving the package through the leak) provides the measurement of leakage. This method is effective for non-porous pouch-form packages, shaped pouches, trays, and uniquely shaped thermoformed containers with induction welded seals. When a sealed package is placed in a surrogate chamber, a pressure differential can be created across the non-porous barrier package walls and seals. Once stabilized, air movement from the higher pressure to the lower will indicate the presence of a leak path, providing a quantitative measure of package integrity without disrupting the package seals. Leakage is measured by the pressure change in the vacant chamber space surrounding the package.

Although many package testing procedures exist, many of these tests involve destructive methods that are not adaptable to in-line testing. Therefore, test packaging or off-line samples are utilized for the testing, making it difficult to ensure the in-line packages are reliable and/or requiring a reduced yield in order to provide sufficient samples for off-line testing.

In addition, the current non-destructive tests are time consuming, also resulting in reduced yield or fewer packages being tested on-line.

Accordingly, there is a need in the art for fast, reliable integrity and quality of seal testing that can be performed in-line with packaging a product.

BRIEF SUMMARY

Embodiments of the invention provide fast (millisecond), non-destructive testing of the integrity of package and/or quality of seal for a variety of packages. According to certain embodiments, a method is provided utilizing dynamic impact characterization to determine whether a loss of pressure due to a leak in the package occurs.

According to one embodiment, an initial pressure is applied to a package, and then a vertical blow/impact is imparted on the package. In a specific embodiment for flexible, compliant packages, the initial pressure is provided by a restraining plate.

The change of pressure due to the impact is measured by sensors located a particular distance from the point of impact. The sensors can include transducers providing force signatures at the location of the sensor due to the vertical impact. The impact can be imparted to the package using an impacting rod. For embodiments utilizing a restraining plate, an opening can be provided through a wall of the plate to enable the impacting rod to contact the package. The impacting rod can be directed to the package using a cylindrical tube.

The waveforms generated by the transducers reflect the seal quality of the package. The existence and location of a leak can be quickly and easily determined by performing a non-destructive impact/blow on the package and comparing the force signatures generated by sensors in contact with the package.

According to one embodiment, four transducers are disposed at equal distances from the vertical impact contact region. The four transducers provide force signals with similar amplitude, duration, and shape when the seal or package is intact and of good quality. A leak will cause at least one transducer (closest to the leak) to show a different force signal; for example, a force signal with a lower amplitude and longer or shorter duration.

In accordance with certain embodiments of the invention, in-line non-destructive testing of package integrity and quality of seal is provided.

BRIEF DESCRIPTION OF THE DRAWINGS

FIG. 3A shows transducer signals for a package without a leak and FIG. 3B shows transducer signals for a package with a leak.

DETAILED DISCLOSURE

Figure 1A:
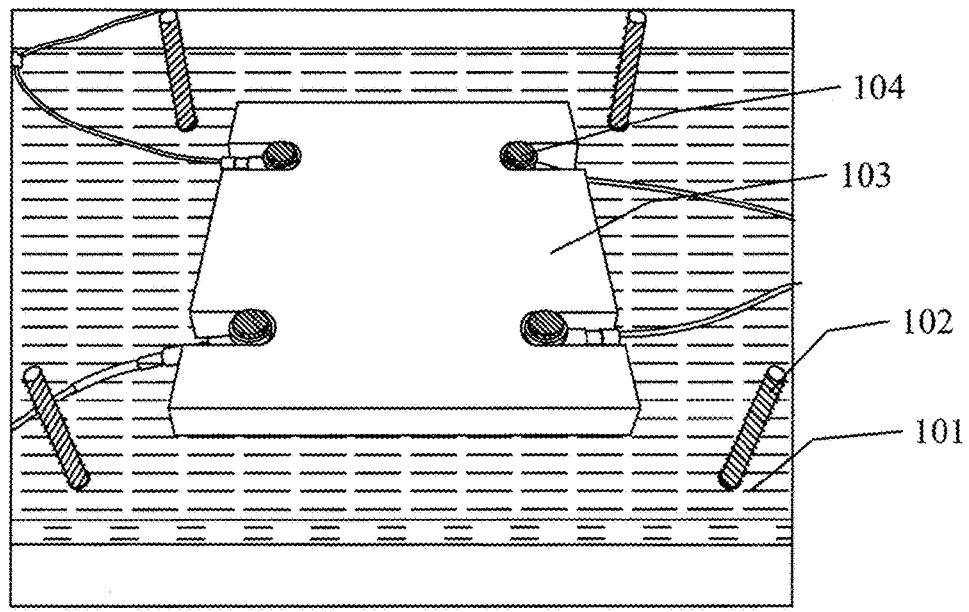
FIGS. 1A-1D show images of a prototype experimental set-up of a testing apparatus and method of testing quality of seal and/or package integrity of a flexible (compliant) plastic package according to one embodiment of the invention.

Testing methods and equipment are provided for fast, non-destructive testing of the integrity and/or quality of seal for a variety of packages. Implementations of embodiments of the invention can be used in any packaging industry with flexible and/or compliant packaging (e.g., chips, frozen foods, plastic packages for medical supplies, cosmetics, etc).

According to certain embodiments, a method is provided utilizing dynamic impact characterization to determine whether a loss of pressure due to a leak in the package occurs.

Embodiments of the invention provide package testing capable of non-intrusive and less disruptive testing as compared to existing test methods. According to certain embodiments, the subject methods and equipment can identify the nature of defects in a package seal and can identify the general location of the defect.

In addition, embodiments of the invention can be applied to any on-line production process for rapid evaluation of the quality of seal and/or package integrity. Implementations of embodiments of the subject apparatus can be provided in-line at a back-end of the product packaging process.

The existence and location of a leak can be quickly and easily determined by performing a non-destructive impact/blow on the package and comparing the force signatures generated by sensors in contact with the package.

According to one embodiment, an initial pressure is applied to a package, and then a blow/impact is imparted on the package. The impact can be imparted to the package using an impacting rod. The impact can be a vertical impact, perpendicular to the impact region of the package. The force of the impact causes a ripple-like effect expanding outward from the impact location along the package. The change of pressure due to the impact is measured by sensors located a particular distance from the point of impact. The sensors can include transducers providing force signatures at the location of the sensor due to the impact. The waveforms generated by the transducers reflect the seal quality or integrity of the package. By comparing one or more of the characteristics of the waveforms, such as amplitude, decay, duration, and shape, with existing or known "good" characteristics, a leak and general location of the leak can be determined. According to certain embodiments, a leak will cause at least one transducer to show a different force signal. For example, at least one transducer closest to the leak may show a force signal with a lower amplitude and a longer or shorter duration than the force signals from other of the transducers.

In one embodiment, the signals from the transducers are compared to stored signals (or values). In another embodiment, the signals from the transducers are compared to each other. In a further embodiment, the signals from the transducers can be compared to the stored signals (or values) and to each other.

In certain embodiments, an optimum or ideal package may be selected and used to provide a reference reading for storage and comparison during the testing. The reference reading can be conducted prior to a production run and/or one or more times during production. Tolerances can also be programmed into the testing.

Embodiments of the subject apparatus can include a computer or processing device that can receive the signals and perform calculations and/or comparisons of the signals to provide a determination of whether a leak exists and/or where the leak exists for a package under test. Data corresponding to signal waveforms or calculations can be stored in a memory. The stored data can be used during the calculations and/or comparisons performed by the computer or processing device.

During a production run using in-line testing, any package that is found to be within the acceptable standards is allowed to continue through to the next in-line machine. Any package failing to meet the acceptable standards can be rejected from the line.

According to one embodiment, four transducers are disposed at equal distances from the impact contact region. For many packages, the four transducers provide force signals with similar amplitude, duration, and shape when the seal is intact and of good quality.

The impact rod can also have a soft rubber/plastic base at its end to cause a more distributed pressure over a larger area upon impact and to reduce damage to the package.

In one embodiment, the impact rod can include, or be retrofitted with, a transducer at the tip, enabling detection of the impact conditions (impact pressure and duration). The impact conditions can further be compared to the responses of the other transducers located at different locations. This allows for establishment of reference characteristics of a good package for later comparison with other packages as well as the repeatability of the impact conditions every time the impact is made on a reference package.

Seal strength values tend to be related to the package size, geometry, and materials. For example, pouches with a long side seal will generally fail on the long seal. In addition, unsupported food tray lid seals may fail at points only relative to their geometry. Furthermore, very flexible package materials may deform with pressurization to an extent that makes seal testing difficult. To address these particular package traits, restraining plates can be used to help equalize distribution of the initial pressure applied to the package. When the package is restrained, material stretching and deformation is minimized, resulting in more uniform application of forces.

In a specific embodiment for flexible, compliant packages, the initial pressure is provided by a restraining plate. An opening can be provided through a wall of the plate to enable the impacting rod to contact the package. The impacting rod can be directed to the package using a cylindrical tube. The sensors can be disposed on a lower plate and/or top plate at positions that can come into contact with the package at desired locations about the package. Sensor readings can be taken when the package is restrained by the restraining plate, and the change of pressure due to the impact is measured by the sensors.

According to various embodiments, a packaging station can be retrofitted with sensors and an impacting rod or a separate equipment station can be provided for the packages to pass through.

A greater understanding of the present invention and of its many advantages may be had from the following examples, given by way of illustration. The following examples are illustrative of some of the methods, applications, embodiments and variants of the present invention. They are, of course, not to be considered in any way limitative of the invention. Numerous changes and modifications can be made with respect to the invention.

Referring to FIG. 1A, a rigid base is provided with force sensors therein. In the prototype experimental setup, a metal plate 101 provides part of the rigid base and has apertures for screws 102 to protrude upward. A second plate 103 (made of plastic) and having a thickness slightly smaller than the height of the transducers 104 provides the remaining part of the rigid base and allows the transducers 104 to be exposed above the surface of the second plate (for contact to a package disposed thereon) while being supported on the metal plate. For other implementations, various rigid bases can be provided with force sensors formed within (such as by injection molding). In addition, other shapes for the base can be utilized instead of a plate for packages having rigid or non-uniform shapes.

Figure 1B:
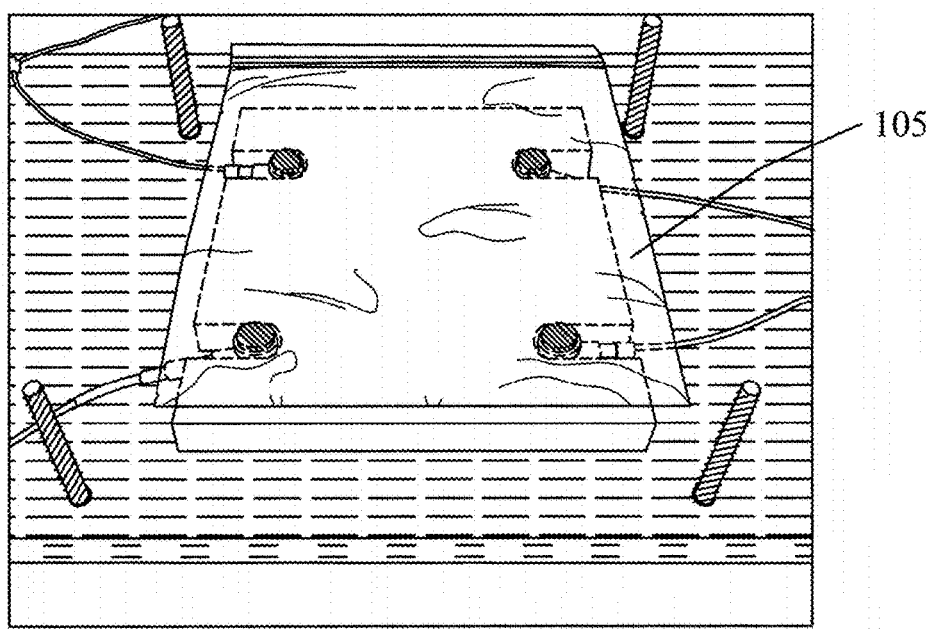

When being tested, a package, such as a plastic bag 105 is disposed on the rigid base having the force sensors, as shown in FIG. 1B. The sensors can be high-frequency force transducers 104. The transducers are arranged to contact any four locations on the plastic bag. Of course, the number and position of the sensors can be adjusted.

Figure 1C:
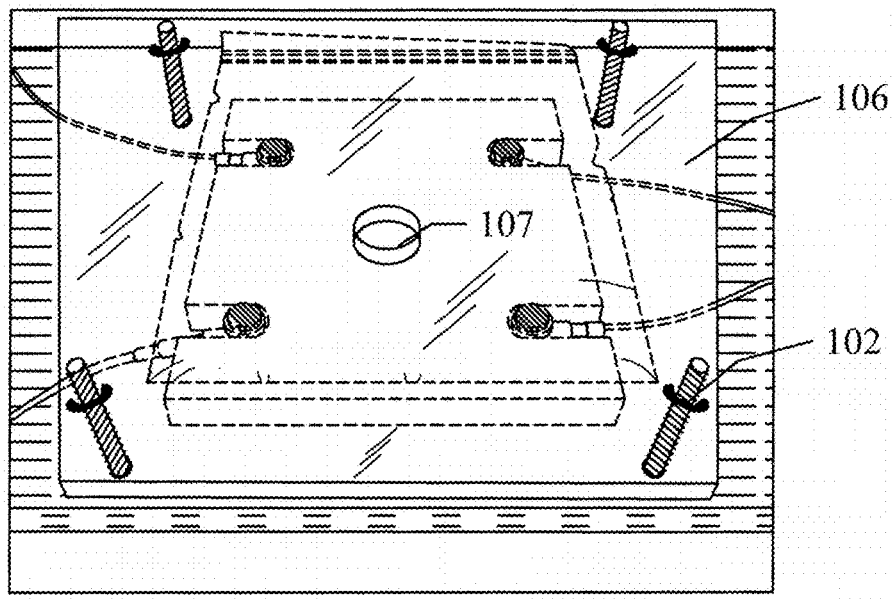

Referring to FIG. 1C, once the plastic bag 105 is in place on the rigid base, a cover plate 106 is provided on the plastic bag and pressed against the plastic bag to provide a uniform stiffness to the package (i.e., no sag in the package). The cover plate and rigid base form a restraining plate for the deformable package. In the prototype experimental setup, the cover plate 106 is made of plastic and the screws 102 protruding from the metal plate are used to hold the cover plate in place. The amount of pressure applied on the package by this plastic plate can be controlled by the four screws. Of course, on a packaging line, other means is likely to hold a package and even any restraining plate or device in place and apply an appropriate amount of pressure.

Figure 1D:
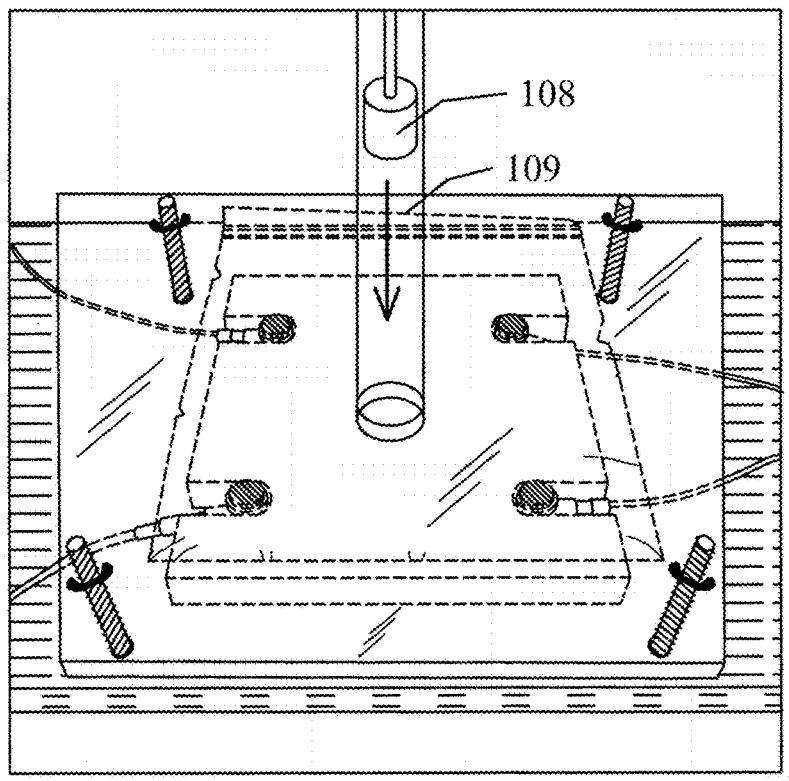

The cover plate 106 includes an opening 107 to expose a portion of the package. The location of the hole is dependent on the shape of the package. Here, the hole is located to correspond with a central region of the package. Then, referring to FIG. 1D, the package is subjected to a non-destructive impact using an impacting rod 108. According to an embodiment, a tube 109 is located in commensuration with the hole in the cover plate, providing a path for the impacting rod. The tube can be cylindrical glass tube aligned with the hole in the cover plate. This tube guides the motion of the impacting rod, formed here of a metal rod with a soft/foam end, when dropped from a prescribed height so as to impart a vertical blow onto the plastic package and create a disturbance in the plastic package. The impact rod includes a pressure sensor to monitor the impact conditions for reference purposes.

Although the sensors are shown in the experimental set-up as being on the back plate, in certain embodiments, the sensor can be embedded or disposed on a cover plate or any other location suitable for the package testing.

The impact of the impacting rod onto the package is immediately detected by the force sensors. The increase in pressure due to this impact is measured. The signal waveforms of the sensors can be compared to each other and/or to predetermined "good" signal signatures.

Figure 2:
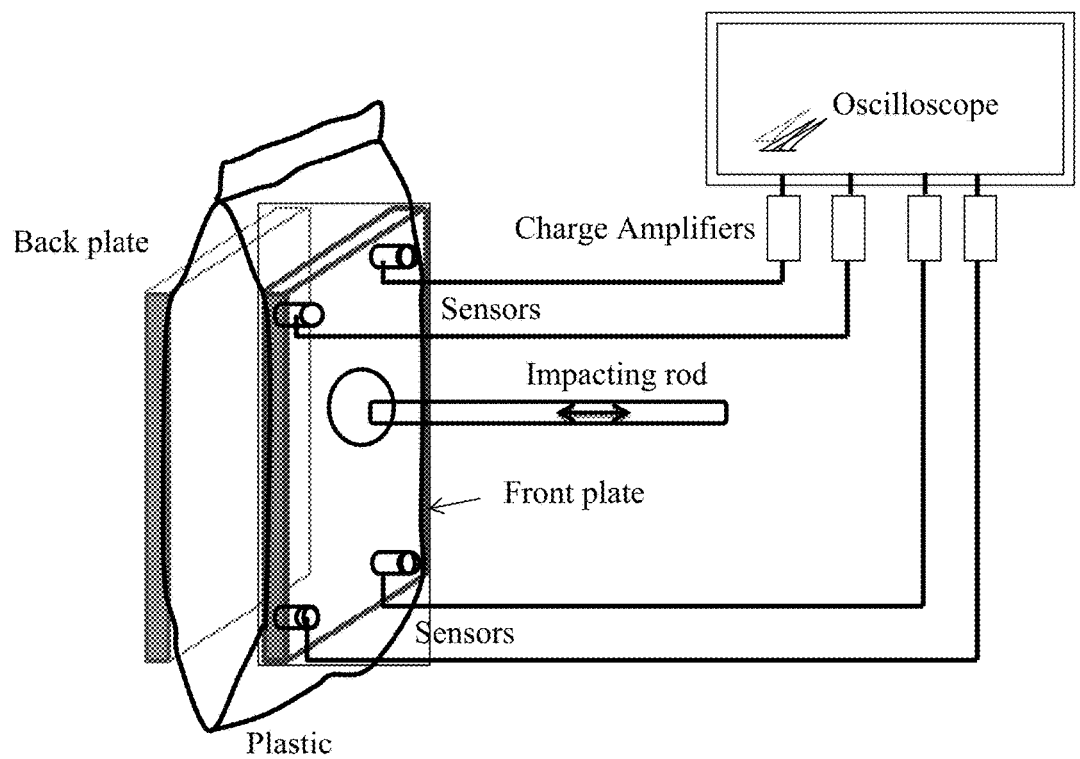
FIG. 2 shows a schematic of a prototype experimental set-up according to an embodiment of the invention.

As shown in FIG. 2, to observe the signals of the force sensors, during the prototype experiment, the force sensors are connected to an oscilloscope with charge amplifiers provided in the signal path to amplify the signals before reaching the oscilloscope.

When a seal or package is intact and of good quality, the four transducers provide similar force signatures, i.e., the four signals have the same amplitude, duration and shape. However, when there is leak, either the sensor(s) closest to the location of the leak will show a different reading or all the four signals generated by the transducers will be of slightly lower amplitude and longer duration. Which one of these two scenarios will occur depends on the size of the package, size of the leak, distance of the leak location from the transducer, pressure inside the package, duration and amplitude of the impact, external pressure applied by the plate on the package, method of holding, etc.

Figure 3A:
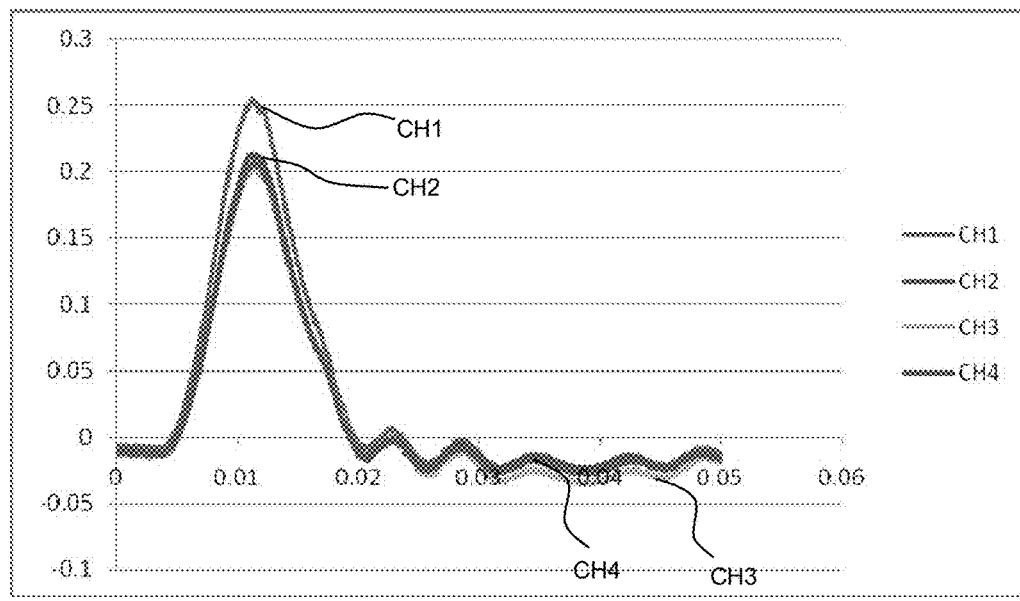
FIGS. 3A and 3B show images of transducer signals obtained using the prototype experimental set-up shown in FIG. 2.
Figure 3B:
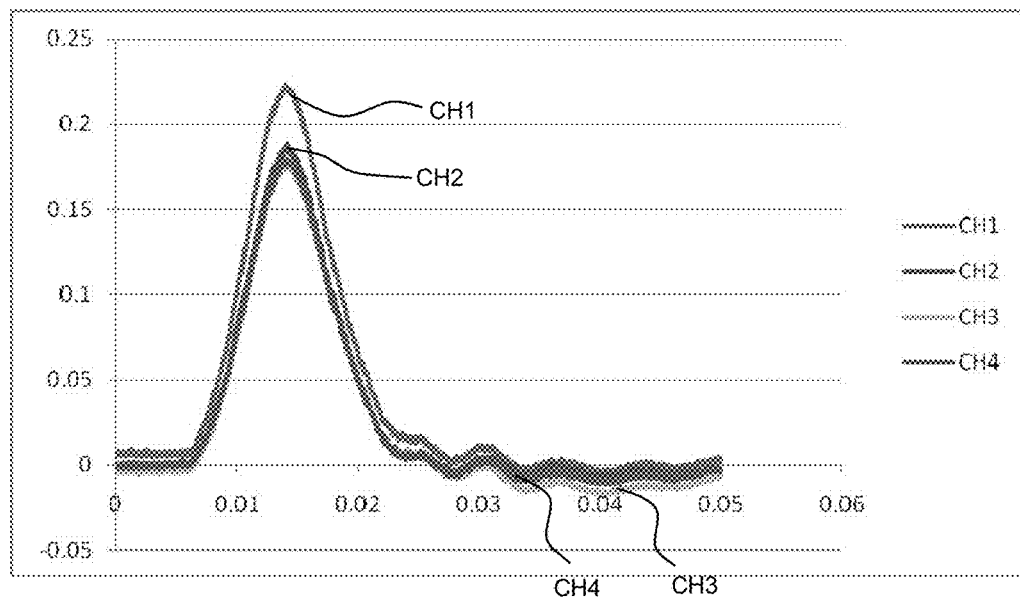

Referring to FIG. 3A, the results of an experiment show that all the four sensors show almost the same amplitude and duration (the slight difference in amplitude of one sensor may be due to improper fixture or small variation in the applied external pressure). FIG. 3B represents the response of the bag to an impulse when a small hole was present in close proximity to one of the sensors, labeled CH4. Comparing the responses shown in FIG. 3A with those shown in FIG. 3B, when there is a small hole, the amplitude of the signal decreased and also its duration decreased slightly.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

It should be understood that the examples and embodiments described herein are for illustrative purposes only and that various modifications or changes in light thereof will be suggested to persons skilled in the art and are to be included within the spirit and purview of this application.

What is claimed is:

1. A method of leak detection of a package, the method comprising:

providing an initial pressure to the package;

impacting a region of the package with a force sufficient to create a disturbance to the package while not destroying the package;

detecting a force signature from the impacting of the region of the package at a location a distance from the region of the package using a sensor; and determining an existence of a leak by evaluating an output of the sensor, wherein the sensor is provided in plurality and each sensor is disposed to detect force signatures at different locations of the package, wherein determining the existence of the leak by evaluating the output of the sensor comprises:

comparing the output of each sensor after the impacting of the region of the package to each other.

2. The method according to claim 1, wherein determining the existence of the leak by evaluating the output of the sensor further comprises comparing the output of each sensor after the impacting of the region of the package to stored signals or values representing a good seal.

* * * * *